United States Patent [19]
Serur

[11] 3,894,954
[45] July 15, 1975

[54] TREATMENT OF BLOOD
[76] Inventor: Juan Richardo Serur, 34A Harvard Ave., Brookline, Mass.
[22] Filed: Dec. 3, 1973
[21] Appl. No.: 421,420

[52] U.S. Cl. ............................. 210/321; 23/258.5
[51] Int. Cl. ............................................ B01d 31/00
[58] Field of Search ............. 23/258.5; 210/22, 321

[56] References Cited
UNITED STATES PATENTS

| | | | |
|---|---|---|---|
| 3,266,629 | 8/1966 | Megibow | 210/321 |
| 3,412,865 | 11/1968 | Lontz et al. | 210/321 |
| 3,416,664 | 12/1968 | Kumme et al. | 210/321 X |
| 3,516,548 | 6/1970 | Alwall et al. | 210/321 |
| 3,631,986 | 1/1972 | Sausse | 210/321 |
| 3,729,098 | 4/1973 | Serur | 210/321 |

*Primary Examiner*—Frank A. Spear, Jr.
*Attorney, Agent, or Firm*—Gordon R. Williamson, Esq.

[57] ABSTRACT

A device for treating blood comprising a first set of fluid channels for blood and a second set of channels for a treatment fluid. Each channel of the first set is defined by a pair of panels of semi-permeable membrane which are supported along spaced-apart lines by supports. At least a portion of the channels of the second set are defined by a pair of membrane panels and a pair of the supports. Each set of channels is arranged into a plurality of layers, the layers alternating between channels of the first and second sets.

7 Claims, 4 Drawing Figures

3,894,954

PATENTED JUL 15 1975　　　　　　　　　3,894,954

SHEET 2

TREATMENT OF BLOOD

This invention relates to the treatment of blood (e.g., dialysis).

It is a principal object of the present invention to provide for the low cost dialysis or oxygenation of blood in a unit of small size without a sacrifice in efficiency.

To achieve these and other objects, the invention features a blood treating device which comprises a first set of channels for blood and a second set of channels for a treatment fluid. Each of the blood channels is defined by a pair of panels of semi-permeable membrane which are supported along spaced-apart lines by supports. At least a portion of the channels for the treatment fluid are defined by a pair of membrane panels and a pair of the supports. The channels of each set are arranged in a plurality of layers, the layers alternating between channels for blood and for treatment fluid. In preferred embodiments each pair of adjacent supports is aligned with a second pair of those supports with the pairs being separated by two thicknesses of the membrane. The supports are so arranged that each of the supports of the first pair cooperates with a support from the second pair to press the membrane thicknesses together along those spaced-apart lines, thereby forming a plurality of side-by-side channels for blood. It is also preferred to arrange the device as a stack of subunits, each subunit comprising a plurality of those supports mounted on a frame in a parallel array with adjacent subunits in the stack separated by two thicknesses of the membrane with blood inlet and outlet means provided for each individual blood channel, while treatment fluid inlet and outlet members provide only for the first and last layers of treatment fluid channels being interconnected serially).

Other objects, features, and advantages of the invention will appear from the following description of a particular preferred embodiment taken together with the accompanying drawings in which.

Figure 1:
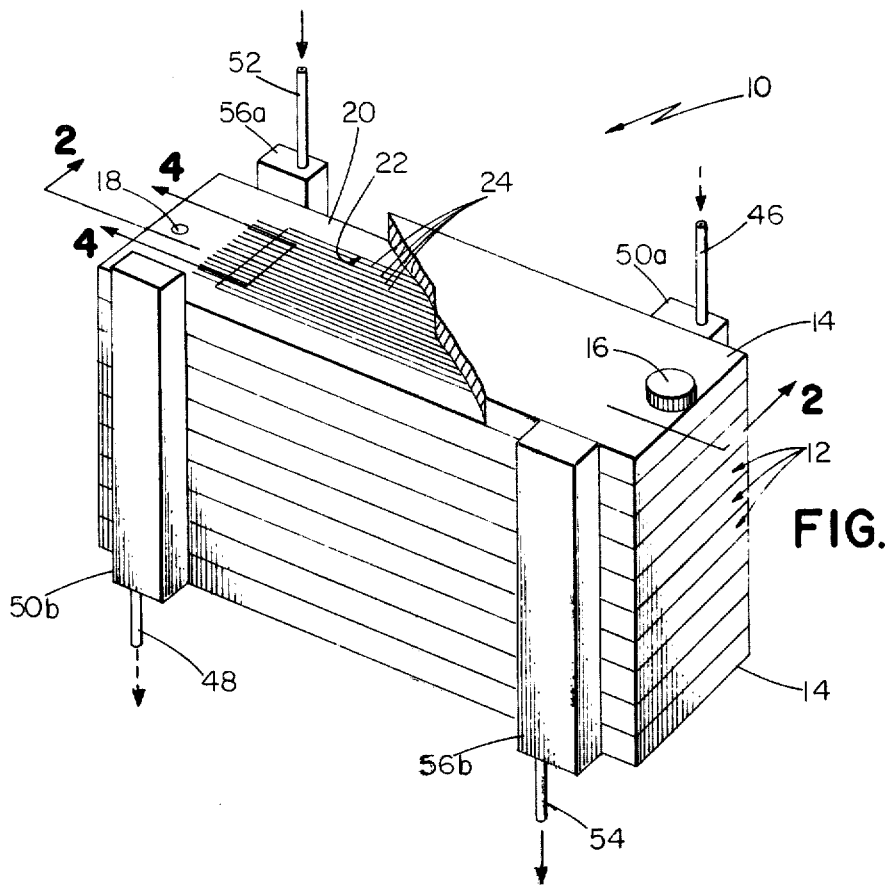
FIG. 1 is a partially broken away respective view of a device constructed according to the present invention.

Referring to the drawings, the device 10 is formed as a stack of identical subunits 12 with closure units 14 disposed at the top and bottom of the stack. This stack is retained as a unit, and rendered leakproof, by any conventional means such as bolts 16 which pass through openings 18 at opposite ends of each unit 12, 14 of the stack.

Figure 3:
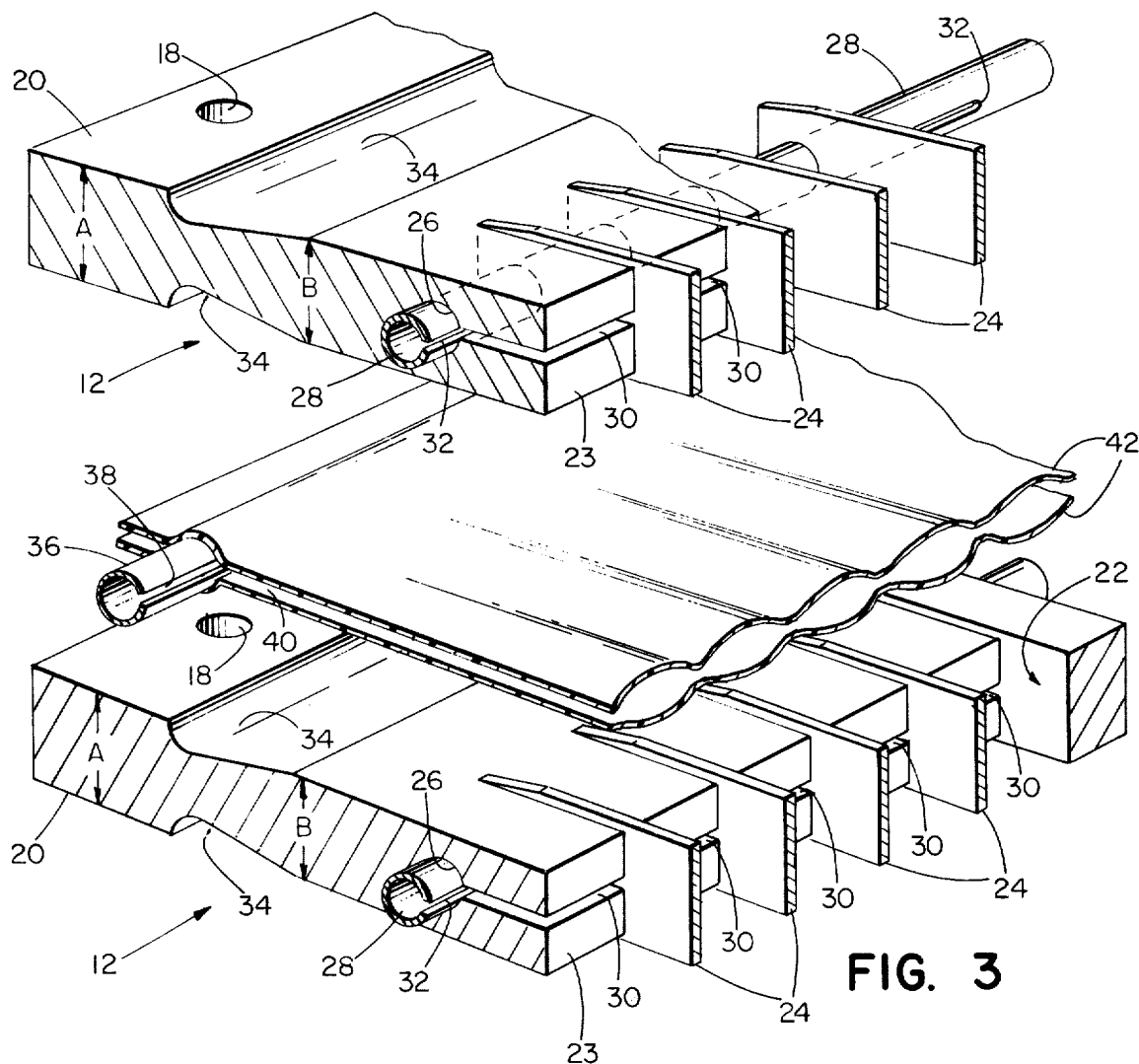
FIG. 3 is a partially broken away exploded view of a portion of the device of FIG. 1.

Each subunit 12 comprises a rectangular frame 20 having an open rectangular central portion 22. A plurality of longitudinally extending ribs 24 are mounted in the opening 22 in a parallel array. Ribs 24 can be formed from any material having sufficient rigidity (e.g., stainless steel) to achieve the support function of the ribs as discussed further below. In a typical device the ribs may be approximately 1 mm. thick and the same height as the maximum thickness of the subunit 20 (e.g., about 0.5 cm.) with a rib spacing of about 3 mm. The ribs 24 are mounted in the frame 20 at their longitudinal ends, which are fitted into appropriately sized vertical slots (see FIG. 3) in the longitudinal end walls 23 of the opening 22. A hole 26 extends through the frame 20, and the end portions of ribs 24, adjacent each end of the opening 22. A hollow tube 28, sized for a snug fit, is inserted into the hole 26. A horizontal slot 30 is cut in each end wall of opening 22 and communicates with the associated hole 26. The tube 28 has a longitudinal slot 32 which extends for the full width of the opening 22 and is aligned with the slot 30.

Figure 2:
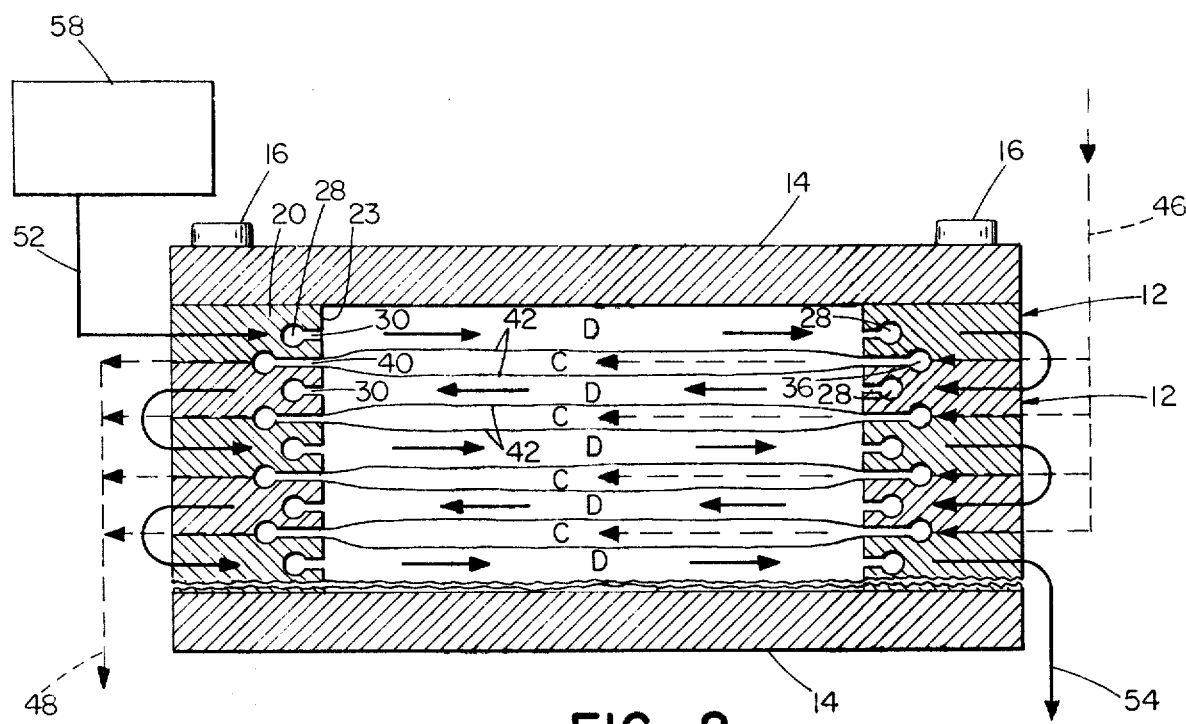
FIG. 2 is a somewhat schematic view taken at 2—2 of FIG. 1.

Recesses 34 extend across the width of the frame 20 on both the upper and lower surfaces thereof at each longitudinal end beyond the locations of holes 26. The recesses 34 of adjacent subunits 12 provide a opening for receiving a hollow tube 36 which extends for the full width of the frame 20 and which includes a horizontally disposed slot 38 which faces the opening 22 in the frame 20. The longitudinal ends of the frame 20 beyond the recesses 34 have a thickness A which is slightly greater than the thickness B of the frame on the other side of the recesses 34. As best seen in FIG. 2, this construction provides openings 40 in the stacked device between adjacent subunits 12, each opening being aligned with the associated slot 38 in a tube 36.

A double thickness of semi-permeable membrane 42 (e.g., cellophane) is disposed between each pair of adjacent subunits 12 and is of such size as to extend over the full width of the device 10 and for the length on each frame 20 between the recesses 34 at opposite ends thereof. Each double thickness of membrane 42 extends between a pair of tubes 36, the slots 38 in those tubes communicating with the space between the two thicknesses of membrane 42.

Figure 4:
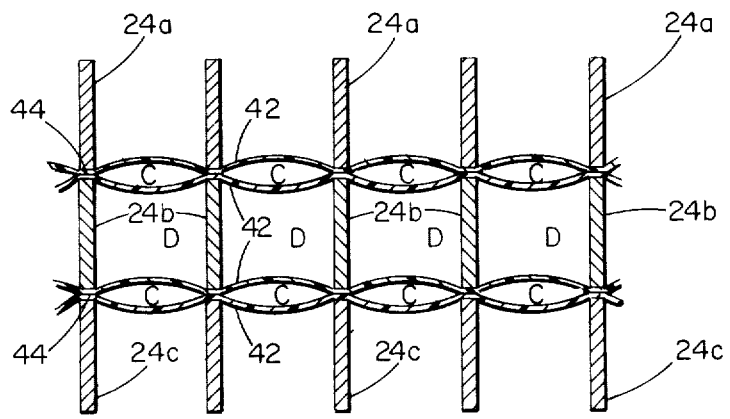
FIG. 4 is a somewaht schematic view taken at 4—4 of FIG. 1.

As best seen in FIG. 4, ribs of adjacent subunits 12 (e.g., ribs 24a, 24b) are vertically aligned with each other and are preferably, but not necessarily, sized to press together the intervening double thickness of the membrane 42, as at 44, thereby forming a series of side-by-side blood channels C which have virtually 100 percent of their surface area formed from membrane 42. The ribs of any given subunit 12 (e.g., ribs 24b) also cooperate with the single thicknesses of membrane 42 immediately above and immediately below those ribs to define treatment fluid channels D. As is apparent from FIG. 4, each of the blood channels C is surrounded by treatment fluid in channels D above and below and each treatment fluid channel D (but for those adjacent the closure units 14) is simultaneously treating blood in two separate blood channels C.

Referring to FIGS. 1 and 2, blood (indicated by broken-line arrows) enters the device 10 through a conduit 46 and is removed from the device through a conduit 48. The conduits 46, 48 communicate with the internal channels (not shown) in units 50a, 50b which are disposed along the sides of the stack of subunits 12 and which provide communication with the various tubes 36. The unit 50a provides communication from the conduit 46 directly to each individual tube 36 so that, as best seen in FIG. 2, blood is delivered to the opening 40 associated with each tube 36 and then to each of the blood channels C simultaneously. The openings 40 assure a homogeneous pressure for the blood delivered to all channels C of the given layer. After the blood has passed the length of the membrane 42 from the tube 36 where it entered (i.e., at the right end of each subunit 12 as viewed in FIG. 1) to the remote tube 36 at that level, it is removed from the device by passages provided in the unit 50b which connect those tubes 36 with the conduit 48.

Treatment fluid (indicated in solid line arrows) enters the device 10 through a conduit 52 and is removed from the device through a conduit 54. Conduits 52 and 54 communicate with internal passages in units 56a, 56b which are symmetrically disposed with respect to units 50, discussed above. As best seen in FIG. 2, although schematically, the treatment fluid from a source 58 is delivered by conduit 52 only to the tube 28 at the left end of the first subunit 12. The treatment fluid flows the full length of the subunit 12 in its side-by-side channels D and then enters the tube 28 at the remote (i.e., right) end of the first subunit 12. The units 56 provide internal passages (not shown) which link the appropriate tubes 28 of adjacent subunits 12 so that the treatment fluid flows through the device in a serpentine fashion in the channels D of all subunits 12 before being removed from the last subunit 12 by the conduit 54.

As will be evident from the foregoing, and particularly from FIG. 4, the device 10 provides a large number of fluid channels, a first set of which (i.e., channels C) carry blood and a second set of which (i.e., channels D) carry treatment fluid. These channels are arranged in alternating layers of side-by-side channels so that each layer of channels C is sandwiched between two layers of channels D. Similarly, but for the uppermost and lowermost layers of channels D, each layer of channels D is in contact with a pair of layers of channels C across panels of membrane 42. With this arrangement in which each interior channel D services two blood channels C, it has been discovered that channels D can be of substantially smaller cross sectional area than heretofore though possible.

Thus, for example, with a length of 40 cm. and width of 20 cm. for each opening 20 in a stack of five units 12 there will be adequate membrane 42 surface area for successful dialysis of human blood. With the present arrangement of each channel D treating two channels C, however, successful dialysis can be maintained in such a device even though the total cross sectional area of all channels D is reduced approximately 40% from the total such area of prior devices in which each channel D treated but one channel C. This, of course, leads to a substantial reduction in size of the device 10 and in the volume of treatment fluid required for each dialysis session with a patient.

While a particular preferred embodiment has been illustrated in the accompanying drawings and described in detail herein, other embodiments are within the scope of the invention and the following claims. As one example, it may be noted that the layers of channels need not be linear. While many configurations are undoubtedly feasible, the transversely "zig-zag" configuration disclosed in my prior U.S. Pat. No. 3,729,098, issued Apr. 24, 1973 may be particularly desirable.

What is claimed is:

1. A device for treating blood comprising a first set of channels for blood and a second set of channels for a treatment fluid, inlet and outlet means for each channel, each channel of said first set defined by a pair of panels of semi-permeable membrane supported along spaced apart lines by supports, at least a portion of the channels of said second set defined by a pair of panels of semi-permeable membrane and a pair of adjacent supports, each pair of adjacent supports being aligned with a second pair of said supports substantially throughout the length of said channels, each set of channels comprising a plurality of layers of side-by-side channels, the layers alternating between channels of said first and second sets, said inlet and outlet means comprising means for delivering untreated blood to a first end of each channel of said first set, means for removing treated blood from a second end of each channel of said first set, means for delivering fresh treatment fluid to each treatment fluid channel in a first layer of such channels, means for removing spent treatment fluid from each treatment fluid channel in a last layer of such channels, and means interconnecting intermediate layers of such channels with said first and last layers, whereby said treatment fluid flows through said layers successively.

2. The device as claimed in claim 1 wherein each of the supports of said pair cooperates with a support of said second pair to press said panels together along said spaced apart lines, thereby forming a plurality of side-by-side channels of said first set in the layer defined by said two panels of said membrane.

3. The device as claimed in claim 1, the device comprising a stack of subunits, each subunit comprising a plurality of said supports mounted on a frame in a parallel array, adjacent subunits in said stack separated by two thicknesses of said membrane.

4. The device as claimed in claim 3 wherein said supports comprise elongated ribs, each rib being mounted in its frame at the rib ends.

5. The device as claimed in claim 4 wherein adjacent pairs of said subunits include aligned recesses extending across each subunit for the width of said ribs beyond a longitudinal end of said ribs, said means for delivering untreated blood to a first end of each channel of said first set comprising said pair of aligned recesses.

6. The device as claimed in claim 4 wherein each rib has a first predetermined thickness in a direction perpendicular to the direction of blood flow in said channels, said frame comprising a central portion in which said ribs are mounted having a second predetermined thickness less than said first predetermined thickness and a peripheral portion having a thickness substantially equal to said predetermined thickness.

7. The device as claimed in claim 6 wherein end portions of said ribs taper to a thickness no greater than said second predetermined thickness.

* * * * *